United States Patent
Sato et al.

(10) Patent No.: US 9,028,911 B2
(45) Date of Patent: May 12, 2015

(54) THERMOSETTING RESIN COMPOSITION FOR SURFACE PROTECTION LAYERS

(75) Inventors: Takashi Sato, Kanagawa (JP); Shuichi Ueno, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 254 days.

(21) Appl. No.: 13/389,972

(22) PCT Filed: Aug. 6, 2010

(86) PCT No.: PCT/JP2010/063409
§ 371 (c)(1), (2), (4) Date: Feb. 10, 2012

(87) PCT Pub. No.: WO2011/019003
PCT Pub. Date: Feb. 17, 2011

(65) Prior Publication Data
US 2012/0142822 A1 Jun. 7, 2012

(30) Foreign Application Priority Data
Aug. 10, 2009 (JP) .................. 2009-185805

(51) Int. Cl.
- B05D 3/02 (2006.01)
- B05D 5/00 (2006.01)
- B05D 5/06 (2006.01)
- C03C 17/32 (2006.01)
- C08L 63/00 (2006.01)
- C09D 163/00 (2006.01)
- C09D 163/02 (2006.01)
- C08G 59/42 (2006.01)

(52) U.S. Cl.
CPC ............. *C08G 59/4215* (2013.01); *C08L 63/00* (2013.01)

(58) Field of Classification Search
None
See application file for complete search history.

(56) References Cited

U.S. PATENT DOCUMENTS

| 7,098,258 B2 * | 8/2006 | Ideno et al. .................. 522/170 |
| 7,569,708 B2 | 8/2009 | Okoshi |
| 2002/0155296 A1 * | 10/2002 | Jonas et al. .................. 428/412 |
| 2004/0077800 A1 * | 4/2004 | Umeyama et al. ............ 525/523 |
| 2008/0039591 A1 | 2/2008 | Sugawara et al. |
| 2008/0306223 A1 * | 12/2008 | Okoshi et al. ................. 525/533 |
| 2010/0140638 A1 | 6/2010 | Kotani et al. |
| 2010/0193831 A1 * | 8/2010 | Sato et al. ..................... 257/100 |

FOREIGN PATENT DOCUMENTS

| JP | 2005036218 A * | 2/2005 | ............ C08G 59/42 |
| JP | 2006182961 A * | 7/2006 | ............ C08G 59/42 |
| JP | 2007 39522 | 2/2007 | |
| JP | 2007039521 A * | 2/2007 | ............ C08G 59/24 |
| JP | 2008 63333 | 3/2008 | |
| JP | 2008081596 A * | 4/2008 | ............ C08G 59/42 |
| JP | 2008106226 A * | 5/2008 | ............ C08G 59/42 |
| WO | 2005 049597 | 6/2005 | |
| WO | 2008 059856 | 5/2008 | |
| WO | 2009 041389 | 4/2009 | |

OTHER PUBLICATIONS

Machine translation of JP-2008-081596, provided by the JPO website (no date).*
International Search Report Issued Oct. 26, 2010 in PCT/JP10/63409 Filed Aug. 6, 2010.

* cited by examiner

*Primary Examiner* — Michael J. Feely
(74) *Attorney, Agent, or Firm* — Oblon, McClelland, Maier & Neustadt, L.L.P.

(57) ABSTRACT

A thermosetting resin composition which includes an epoxy-containing component and a curing agent component containing a cyclohexanetricarboxylic anhydride. The cured product of the thermosetting resin composition is excellent in surface hardness, solvent resistance, transparency, and adhesion to substrate, and is useful as a surface protection layer of the substrate.

5 Claims, No Drawings

1

THERMOSETTING RESIN COMPOSITION FOR SURFACE PROTECTION LAYERS

TECHNICAL FIELD

The present invention relates to a thermosetting resin composition for forming a surface protection layer which prevents the deterioration, damage, etc. of the surface of substrate, and more specifically relates to a thermosetting resin composition for forming a surface protection layer which is excellent in surface hardness, solvent resistance, transparency, and adhesion to a substrate to be protected.

BACKGROUND ART

Recently, it has been demanded to reduce the weight of the parts for use in the production of displays and information appliances. Therefore, the substitution of parts made of a polymer material for conventional parts made of a metal or glass material is proceeding rapidly.

However, as compared with the metal or glass material, the polymer material is generally poor in the deterioration resistance, the damage resistance, the solvent resistance, etc. To improve these properties, a surface protection layer is formed on the surface of parts made of the polymer material.

The surface protection layer is required to be excellent in the properties, such as surface hardness, the solvent resistance, the transparency, and adhesion to substrate.

Surface protection layers made of an acrylate or silicone material has been known (Patent Documents 1 to 4). However, the surface protection layer made of an acrylate material involves drawbacks, for example, the surface protection layer is uneven because the acrylate material is cured by ultraviolet ray and discolored because of the use of a photoinitiator, and the solvent resistance is not so good. The surface protection layer made of the silicone material also involves drawbacks, such as poor adhesion to substrate.

Patent Document 1: JP 2008-133367A
Patent Document 2: JP 2008-129130A
Patent Document 3: JP 2008-120986A
Patent Document 4: JP 2008-46392A

DISCLOSURE OF THE INVENTION

An object of the present invention is to provide a thermosetting resin composition for producing a surface protection layer which is excellent in the surface hardness, the solvent resistance, the transparency, and the adhesion to substrate.

As a result of extensive research for solving the above problem, the inventors have found that a surface protection layer having a high surface hardness and excellent solvent resistance, transparency, and adhesion to substrate are obtained by curing a composition comprising an epoxy-containing component and a curing agent component comprising a cyclohexanetricarboxylic anhydride. The present invention is based on this finding.

Thus, the present invention relates to a thermosetting resin composition for a surface protection layer, which comprises an epoxy-containing component and a curing agent component comprising a cyclohexanetricarboxylic anhydride, a cured product of the thermosetting resin composition, a laminate comprising a substrate and a surface protection layer formed on a substrate, and a method of protecting a surface of a substrate.

The thermosetting resin composition of the invention is excellent in the surface hardness, solvent resistance, transparency, and adhesion to substrate. Therefore, the thermosetting resin composition is useful as a resin composition for forming a surface protection layer and suitably used in the production of display front panels, automotive windows, etc.

BEST MODE FOR CARRYING OUT THE INVENTION

The thermosetting resin composition of the invention comprises an epoxy-containing component and a curing agent component comprising a cyclohexanetricarboxylic anhydride.

The curing agent component comprises a cyclohexanetricarboxylic anhydride (curing agent A). Examples of the cyclohexanetricarboxylic anhydride include cyclohexane-1,2,4-tricarboxylic-1,2-anhydride and cyclohexane-1,2,3-tricarboxylic-1,2-anhydride. These compounds may be used alone or in combination. The cyclohexanetricarboxylic anhydride is synthesized, for example, by the hydrogenation of trimellitic acid.

The content of the cyclohexanetricarboxylic anhydride in the curing agent component is not particularly limited and is preferably 10% by mass or more and more preferably 30% by mass or more (each inclusive of 100%) because the solvent resistance is enhanced.

The curing agent component may further comprise one or more kinds of acid anhydrides (curing agent B) other than the cyclohexanetricarboxylic anhydride. The type of the curing agent B is not particularly limited as long as the properties of the thermosetting resin composition and its cured product are not adversely affected. The content of the curing agent B in the curing agent component is preferably 90% by mass or less and more preferably 70% by mass or less (each inclusive of zero).

Examples of the curing agent B include tetrahydrophthalic anhydride, hexahydrophthalic anhydride, methyltetrahydrophthalic anhydride, methylhexahydrophthalic anhydride, methylnadic anhydride, trialkyltetrahydrophthalic anhydride, methylcyclohexenetetracarboxylic dianhydride, phthalic anhydride, trimellitic anhydride, pyromellitic anhydride, benzophenonetetracarboxylic dianhydride, ethylene glycol bis(anhydrotrimellitate), glycerol bis(anhydrotrimellitate) monoacetate, dodecenylsuccinic anhydride, aliphatic dicarboxylic polyanhydride, chlorendic anhydride, and hydrogenated products of the preceding acid anhydrides, with tetrahydrophthalic anhydride, hexahydrophthalic anhydride, methyltetrahydrophthalic anhydride, and methylhexahydrophthalic anhydride being preferred, because these acid anhydrides are well compatible with the cyclohexanetricarboxylic anhydride.

The curing agent component may further comprise an epoxy resin curing agent (curing agent C) other than the acid anhydrides (curing agents A and B) as long as the effect of the invention is not adversely affected. Examples of the curing agent C include carboxylic acids, such as cyclohexane-1,2,4-tricarboxylic acid, cyclohexane-1,2,3-tricarboxylic acid, cyclohexane-1,3,5-tricarboxylic acid, cyclohexane-1,2-dicarboxylic acid, 3-methylcyclohexane-1,2-dicarboxylic acid, and 4-methylcyclohexane-1,2-dicarboxylic acid. The content of the curing agent C in the curing agent component is preferably 50% by mass or less and more preferably 30% by mass or less (each inclusive of zero).

The thermosetting resin composition of the invention may comprise one or more kinds of epoxy resins as the epoxy-containing component. The kind thereof is not particularly limited as long as the properties of the thermosetting resin composition and its cured product are not adversely affected.

Examples of the epoxy resin usable in the present invention include bisphenol A type epoxy resin, bisphenol F type epoxy resin, cresol novolac type epoxy resin, phenol novolac type epoxy resin, biphenyl type epoxy resin, stilbene type epoxy resin, hydroquinone type epoxy resin, naphthalene skeleton epoxy resin, tetraphenylolethane type epoxy resin, DPP type epoxy resin, trishydroxyphenylmethane type epoxy resin, alicyclic epoxy resin, such as dicyclopentadiene phenol type epoxy resin, 3,4-epoxycyclohexylmethyl-3',4'-epoxycyclohexanecarboxylate and vinylcyclohexene diepoxide, diglycidyl ether of bisphenol A-ethylene oxide adduct, diglycidyl ether of bisphenol A-propylene oxide adduct, cyclohexanedimethanol diglycidyl ether, polyglycidyl ether of aliphatic polyol, polyglycidyl ester of polybasic acid, such as diglycidyl ester of hexahydrophthalic anhydride, alkyl glycidyl ether, such as butyl glycidyl ether and lauryl glycidyl ether, glycidyl ether having one epoxy group, such as phenyl glycidyl ether and cresyl glycidyl ether, and nuclear-hydrogenated products of the preceding epoxy resins. These epoxy resins may be used alone or in combination of two or more. Of the above epoxy resins, bisphenol A type epoxy resin, its nuclear-hydrogenated product, 3,4-epoxycyclohexylmethyl-3',4'-epoxycyclohexanecarboxylate, and polyglycidyl ether of aliphatic polyol are preferred because they are liquid and hard to volatilize, and therefore, easy to handle.

The blending amounts of the epoxy resin (epoxy-containing component) and the curing agent component are not particularly limited as long as the intended effect is obtained, and generally about 0.1 to 2 equivalents of the curing agent (total of the curing agents A, B, and C) per one equivalent of epoxy group. If being 0.1 equiv or more, the curing proceeds well. If being 2 equiv or less, the cured product is prevented from lowering of the glass transition temperature (Tg), deterioration of the moisture absorption, lowering the transparency, and discoloration under a long-term heating. To one equivalent of epoxy group, one mole of acid anhydride group is one equivalent and one mole of carboxyl group is one equivalent.

A curing accelerator may be used as long as the effect of the invention is not adversely affected, although the excessive use thereof is not recommended because the transparency of the cured product may be deteriorated and the appearance of the surface protection layer may be spoiled. Examples thereof include tertiary amines, such as benzyldimethylamine, tris (dimethylaminomethyl)phenol, and dimethylcyclohexylamine; imidazole compounds, such as 1-cyanoethyl-2-ethyl-4-methylimidazole, 2-ethyl-4-methylimidazole, and 1-benzyl-2-methylimidazole; organic phosphorus compounds, such as triphenylphosphine and triphenyl phosphite; quaternary phosphonium salts, such as tetraphenylphosphonium bromide, tetra-n-butylphosphonium bromide, and triphenylbenzylphosphonium bromide; diazabicycloalkenes, such as 1,8-diazabicyclo[5.4.0]undecene-7; organic salts of diazabicycloalkenes; organometallic compounds, such as zinc octoate, tin octoate, and sluminum acetylacetonate complex; quaternary ammonium salts, such as tetraethylammonium bromide and tetraburylammonium bromide; boron compounds, such as boron trifluoride and triphenyl borate; and metal halides, such as zinc chloride and tin(IV) chloride.

Latent curing accelerators are also usable. Examples thereof include high-melting, dispersible latent accelerators, such as amine-added accelerator which is an adduct of an epoxy resin with a high-melting imidazole compound, dicyandiamide, or amine; micloencapsulated latent accelerators obtainable by coating the surface of an imidazole-, phosphorus-, or phosphine-type accelerator with a polymer; amine salt-type latent curing accelerators; and high-temperature dissociation, thermoinitiated cationic polymerization-type latent curing accelerators, such as Lewis acid salt and Brønsted acid salt.

These curing accelerators may be used alone or in combination of two or more. The use of the curing accelerator is optional. The amount thereof is preferably 0 to 3 parts by mass, more preferably 0.1 to 3 parts by mass, and still more preferably 0.1 to 1 part by mass per 100 parts by mass of the epoxy-containing component and the curing agent component in total.

The thermosetting resin composition of the invention may be blended with an additive, if necessary, in an amount not adversely affecting the properties of the resulting thermosetting resin composition and its cured product. Examples of the additive include inhibitor for preventing evolution of carbon dioxide, such as an aliphatic or aromatic carboxylic acid and phenol compounds; flexibility modifier, such as polyalkylene glycol; antioxidant; plasticizer; lubricant; silane-type coupling agent; surface treatment such as inorganic filler; flame retardant; antistatic agent; colorant; leveling agent; ion trapping agent; slide improver; rubber; impact modifier such as organic polymer beads; thixotropy modifier; surfactant; surface tension depressant; anti-foaming agent; anti-setting agent; diffusing agent; ultraviolet absorber; antioxidant; release agent; fluorescent agent; conducting filler; and low-viscosity solvent for modifying viscosity.

The thermosetting resin composition of the invention is obtained by uniformly mixing the above components. The components may be dissolved in a solvent, if necessary.

Examples of the solvent include ketones, such as methyl ethyl ketone, methyl isobutyl ketone, cyclohexanone, and isophorone; ethers, such as ethylene glycol dimethyl ether, diethylene glycol dimethyl ether, and dioxane; alcohols, such as methanol, ethanol, 1-propanol, 2-propanol, and 1-methoxy-2-propanol; aliphatic polyols, such as ethylene glycol and propylene glycol; and acetic esters, such as ethylene glycol 1-monomethyl ether 2-acetate, ethylene glycol 1-monoethyl ether 2-acetate, propylene glycol 1-monomethyl ether 2-acetate, and propylene glycol 1-monoethyl ether 2-acetate.

Of the above solvents, methanol, ethanol, 1-propanol, 2-propanol, 1-methoxy-2-propanol, and propylene glycol 1-monomethyl ether 2-acetate are preferred because of their good solvent power and coating properties.

The order of mixing the components and the solid concentration of the thermosetting resin composition are not particularly limited and suitably selected according to the use of the thermosetting resin composition and the method of coating it on the substrate. If using the solvent, the total concentration of the epoxy-containing component, the curing agent component, and the curing accelerator is preferably 10 to 60% by mass and more preferably 20 to 60% by mass.

The thermosetting resin composition (composition for protection layer) of the invention is coated on at least a part of the substrate surface and then cured on the substrate, thereby forming the surface protection layer (cured product) and obtaining a laminate having a surface protected with the cured product. The method of coating on the substrate may be any of a spraying method, a spin coating method, a roll coating method, and a printing method. The curing method is not particularly limited, and a known curing oven, such as a closed-type curing oven and a tunnel oven capable of continuous curing, can be employed. The curing method is also not particularly limited, and a known method, such as a hot air circulation method, a infrared heating method, and a high-frequency heating method, is employed. The curing temperature and time are preferably 80 to 250° C. for 30 s to 10 h. If a cured product with a low internal stress is required, the curing is preferably conducted by pre-curing at 80 to 120° C. for 0.5 to 5 h and then post-curing at 120 to 180° C. for 0.1 to 5 h. If the curing in a short time is required, the curing is conducted preferably at 150 to 250° C. for 30 s to 30 min.

As described above, the thermosetting resin composition of the invention can be easily coated on the substrate by any of known methods into any thickness, and by drying under heating a surface protection layer excellent in surface hardness, solvent resistance, transparency, adhesion to substrate, flatness, toughness, heat resistance, and light resistance is easily obtained. The thickness of the surface protection layer is preferably 3 to 50 μm, although depending upon the use of the laminate. If being 3 μm or more, the hardness is improved. If 50 μm or less, the surface protection layer is hardly cracked even when the substrate is bent.

The material of the substrate to be protected by the surface protection layer of the invention include polycarbonate, polyethylene terephthalate, polystyrene, MS resin (methyl methacrylate-styrene copolymer), and cyclic polyolefin. The shape and thickness of the substrate is not particularly limited.

The thermosetting resin composition of the invention is useful particularly for forming a surface protection layer of a display front panel which requires high hardness and an automotive window which requires high hardness, high solvent resistance, high resistance to light, etc. because it is exposed to weather.

EXAMPLES

The present invention will be described in more detail with reference to examples and comparative examples. However, it should be noted that the scope of the present invention is not limited to the following examples.
Pencil Hardness The pencil hardness of a surface protection layer was measured by scratching with pencil according to JIS K 5400. Specifically, a line of about 5-mm long was made on the surface of a polycarbonate sheet having a surface protection layer using a selected pencil at an angle of 45° under a load of 1 kg, and then the surface was judged whether or not scratched. The pencil hardness was determined as the grade of the hardest pencil that did not scratch the surface.
Solvent Resistance A drop of 2-propanol (IPA), N-methylpyrrolidone (NMP), or methyl ethyl ketone (MEK) having a temperature of 25° C. was put on the surface protection layer of a polycarbonate sheet. The drop of the solvent was kept not evaporated by surrounding the drop with O-ring and glass plate which are not affected by these solvents. After 15 min, the appearance of the surface protection layer was visually observed.

The solvent resistance was rated as A when no change was observed on the surface protection layer, B when the surface protection layer was changed, but no change in the substrate (polycarbonate sheet), and C when the change reached the substrate (polycarbonate sheet).
Adhesion The test was conducted according to JIS K 5600. On the surface protection layer of a polycarbonate sheet, five scratched lines with 1-mm intervals were drawn lengthwise and crosswise to make a cross-hatch pattern with 25 cut squares. A piece of cellophane adhesive tape was applied on the cross-hatch pattern and removed quickly. The adhesion was evaluated by the number of remaining cut squares not pulled off. The adhesion was rated as A when no cut square was pulled off.

REFERENCE EXAMPLE

The pencil hardness of a polycarbonate sheet (Iupilon NF-2000 manufactured by Mitsubishi Gas Chemical Company, Inc., 1.5 mm thick) was measured.

Example 1

A mixture of 24.5 parts by mass of cyclohexane-1,2,4-tricarboxylic-1,2-anhydride (manufactured by Mitsubishi Gas Chemical Company, Inc.), 50.6 parts by mass of bisphenol A-type epoxy resin (jER828 manufactured Japan Epoxy Resins Co., Ltd., epoxy equivalent: 187), and 0.27 part by mass of triphenylbenzylphosphonium bromide (U-CAT5003 manufactured by San-Apro Ltd.) was diluted with 1-methoxy-2-propanol to 50% by mass, to obtain a thermosetting resin composition for surface protection layer.

The obtained composition was coated on a polycarbonate sheet (Iupilon NF-2000 manufactured by Mitsubishi Gas Chemical Company, Inc., 1.5 mm thick) using a bar coater and cured by heating at 120° C. for 3 h in a hot-air dryer, to obtain a polycarbonate sheet having a surface protection layer with a thickness of about 10 μm. The obtained sheet was tested for the properties mentioned above.

Example 2

A mixture of 26.5 parts by mass of cyclohexane-1,2,4-tricarboxylic-1,2-anhydride (manufactured by Mitsubishi Gas Chemical Company, Inc.), 48.3 parts by mass of a cyclic epoxy resin (3,4-epoxycyclohexylmethyl-3',4'-epoxycyclohexanecarboxylate: CEL2021P manufactured by Daicel Chemical Industries, Ltd.), and 0.33 part by mass of triphenylbenzylphosphonium bromide (U-CAT5003 manufactured by San-Apro Ltd.) was diluted with propylene glycol 1-monomethyl ether 2-acetate to 50% by mass, to obtain a thermosetting resin composition for surface protection layer.

The obtained composition was coated on a polycarbonate sheet (Iupilon NF-2000 manufactured by Mitsubishi Gas Chemical Company, Inc., 1.5 mm thick) using a bar coater and cured by heating at 120° C. for 3 h in a hot-air dryer, to obtain a polycarbonate sheet having a surface protection layer with a thickness of about 10 μm. The obtained sheet was tested for the properties mentioned above.

Example 3

A mixture of 24.5 parts by mass of cyclohexane-1,2,4-tricarboxylic-1,2-anhydride (manufactured by Mitsubishi Gas Chemical Company, Inc.), 56.3 parts by mass of a nuclear-hydrogenated product of bisphenol A-type epoxy resin (YX8000 manufactured Japan Epoxy Resins Co., Ltd., epoxy equivalent: 205), and 0.27 part by mass of triphenylbenzylphosphonium bromide (U-CAT5003 manufactured by San-Apro Ltd.) was diluted with 1-methoxy-2-propanol to 50% by mass, to obtain a thermosetting resin composition for surface protection layer.

The obtained composition was coated on a polycarbonate sheet (Iupilon NF-2000 manufactured by Mitsubishi Gas Chemical Company, Inc., 1.5 mm thick) using a bar coater and cured by heating at 120° C. for 3 h in a hot-air dryer, to obtain a polycarbonate sheet having a surface protection layer with a thickness of about 10 μm. The obtained sheet was tested for the properties mentioned above.

Comparative Example 1

A 10% by mass solution of an acrylic resin (Parapet HR-L manufactured by Kuraray Co., Ltd.) in 1-methoxy-2-propanol was prepared. The obtained solution was coated on a polycarbonate sheet (Iupilon NF-2000 manufactured by Mitsubishi Gas Chemical Company, Inc., 1.5 mm thick) using a bar coater and cured by heating at 120° C. for 3 h in a hot-air dryer, to obtain a polycarbonate sheet having a surface protection layer with a thickness of about 10 μm. The obtained sheet was tested for the properties mentioned above.

Comparative Example 2

A mixture of 33.5 parts by mass of a blend of hexahydrophthalic anhydride and methylhexahydrophthalic anhydride (MH700G manufactured by New Japan Chemical Co., Ltd.), 41.3 parts by mass of bisphenol A-type epoxy resin (jER828 manufactured Japan Epoxy Resins Co., Ltd., epoxy equivalent: 187), and 0.22 part by mass of triphenylbenzylphosphonium bromide (U-CAT5003 manufactured by San-Apro Ltd.) was diluted with 1-methoxy-2-propanol to 50% by mass, to obtain a thermosetting resin composition for surface protection layer.

The obtained composition was coated on a polycarbonate sheet (Iupilon NF-2000 manufactured by Mitsubishi Gas Chemical Company, Inc., 1.5 mm thick) using a bar coater and cured by heating at 120° C. for 3 h in a hot-air dryer, to obtain a polycarbonate sheet having a surface protection layer with a thickness of about 10 μm. The obtained sheet was tested for the properties mentioned above.

Comparative Example 3

A mixture of 33.5 parts by mass of a blend of hexahydrophthalic anhydride and methylhexahydrophthalic anhydride (MH700G manufactured by New Japan Chemical Co., Ltd.), 45.3 parts by mass of a nuclear-hydrogenated product of bisphenol A-type epoxy resin (YX8000 manufactured Japan Epoxy Resins Co., Ltd., epoxy equivalent: 205), and 0.22 parts by mass of triphenylbenzylphosphonium bromide (U-CAT5003 manufactured by San-Apro Ltd.) was diluted with 1-methoxy-2-propanol to 50% by mass, to obtain a thermosetting resin composition for surface protection layer.

The obtained composition was coated on a polycarbonate sheet (Iupilon NF-2000 manufactured by Mitsubishi Gas Chemical Company, Inc., 1.5 mm thick) using a bar coater and cured by heating at 120° C. for 3 h in a hot-air dryer, to obtain a polycarbonate sheet having a surface protection layer with a thickness of about 10 μm. The obtained sheet was tested for the properties mentioned above.

As seen from Table 1, the surface protection layer obtained by curing the composition which comprises the epoxy-containing component and the curing agent component comprising the cyclohexanetricarboxylic anhydride has a high hardness, a good solvent resistance, and a good adhesion.

TABLE 1

|  | Reference Example | Examples | | | Comparative Examples | | |
| --- | --- | --- | --- | --- | --- | --- | --- |
|  |  | 1 | 2 | 3 | 1 | 2 | 3 |
| Pencil Hardness | 4B | F | F | HB | HB | HB | 3B |
| Solvent Resistance |  |  |  |  |  |  |  |
| IPA | — | A | A | A | B | A | B |
| NMP | — | B | B | B | C | C | C |
| MEK | — | B | B | B | C | C | C |
| Adhesion | — | A | A | A | — | — | A |

What is claimed is:

1. A method for protecting a surface of a substrate, comprising:
    coating at least a part of a surface of a substrate with a thermosetting resin composition; and
    curing the composition, to form a surface protection layer on the surface of the substrate,
    wherein
    the substrate is a display front panel or an automotive window,
    the surface protection layer has a thickness of 3 to 50 μm, and
    the thermosetting resin composition comprises:
        an epoxy-comprising component;
        a curing agent component consisting of cyclohexane-1,2,4-tricarboxylic-1,2-anhydride;
        at least one solvent selected from the group consisting of methanol, ethanol, 1-propanol, 2-propanol, 1-methoxy-2-propanol, and propylene glycol 1-monomethyl ether 2-acetate, and
        at least one curing accelerator selected from the group consisting of quaternary phosphonium salt selected from the group consisting of tetraphenylphosphonium bromide, tetra-n-butylphosphonium bromide, and triphenylbenzylphosphonium bromide, and
    wherein an amount of the curing agent component is 0.1 to 2 equivalents per one equivalent of epoxy group, based on one mole of an acid anhydride group being one equivalent to an epoxy group and one mole of a carboxyl group being one equivalent to an epoxy group,
    wherein an amount of the curing accelerator is 0.1 to 1 part by mass of a total amount of the epoxy-containing component and the curing agent, and
    wherein the cured surface protection layer on the surface of the substrate has HB to F of Pencil Hardness by scratching with a pencil according to JIS K5400.

2. The method of claim 1, wherein the epoxy-comprising component is selected from the group consisting of a bisphenol A epoxy resin, a nuclear-hydrogenated product of a bisphenol A epoxy resin, 3,4-epoxycyclohexylmethyl-3',4'-epoxycyclohexanecarboxylate, and a polyglycidyl ether of an aliphatic polyol.

3. The method of claim 1, wherein the organic solvent comprises 1-methoxy-2-propanol.

4. The method of claim 1, wherein the organic solvent comprises propylene glycol 1-monomethyl ether 2-acetate.

5. The method of claim 1, wherein the substrate is an automotive window.

* * * * *